US011159516B2

(12) United States Patent
Kurylko et al.

(10) Patent No.: US 11,159,516 B2
(45) Date of Patent: Oct. 26, 2021

(54) SYSTEMS AND METHODS FOR USE IN SHARING DIGITAL IDENTITIES

(71) Applicant: MASTERCARD INTERNATIONAL INCORPORATED, Purchase, NY (US)

(72) Inventors: Marek Kurylko, Bloomfield, NJ (US); Joseph Hayes, Montclair, NJ (US); Eugene Reda, Little Falls, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 252 days.

(21) Appl. No.: 16/505,325

(22) Filed: Jul. 8, 2019

(65) Prior Publication Data
US 2021/0014218 A1    Jan. 14, 2021

(51) Int. Cl.
*H04L 29/06* (2006.01)
*H04L 9/08* (2006.01)
*G06F 21/60* (2013.01)

(52) U.S. Cl.
CPC ........ *H04L 63/0838* (2013.01); *G06F 21/602* (2013.01); *H04L 9/085* (2013.01); *H04L 63/0861* (2013.01)

(58) Field of Classification Search
None
See application file for complete search history.

(56) References Cited

U.S. PATENT DOCUMENTS

| 10,255,419 | B1* | 4/2019 | Kragh | H04L 9/3231 |
| 2011/0145899 | A1* | 6/2011 | Cao | H04L 9/3247 726/7 |
| 2018/0130060 | A1* | 5/2018 | Hayes | G06Q 20/4014 |

* cited by examiner

*Primary Examiner* — William J. Goodchild
(74) *Attorney, Agent, or Firm* — Harness, Dickey & Pierce, P.L.C.

(57) ABSTRACT

Systems and methods are provided for using an identity provider (IDP) to implement enrollment of a user to a relying party. One exemplary method includes receiving a login credential for a user from a relying party in connection with enrolling the user to the relying party, where the user is associated with a digital identity and the digital identity includes personal identifying information (PII) of the user. The method also includes generating a one-time-passcode (OTP) and transmitting the OTP to a communication device bound to the digital identity associated with the user, receiving an OTP from the relying party, and when the OTP generated by the computing device matches the OTP received from the relying party, compiling an enrollment file for the user including at least a portion of the PII of the user. The method then includes transmitting the enrollment file to the relying party.

14 Claims, 7 Drawing Sheets

SYSTEMS AND METHODS FOR USE IN SHARING DIGITAL IDENTITIES

FIELD

The present disclosure is generally directed to systems and methods for use in sharing digital identities in connection with login processes associated with relying parties.

BACKGROUND

This section provides background information related to the present disclosure which is not necessarily prior art.

Users are known to access a variety of different accounts in a given day. The accounts may include, without limitation, banking institution web accounts, email accounts, fitness application accounts, etc. Each of the accounts may require particular credentials, such as a user name and password when accessing the account, to inhibit unauthorized persons from doing the same. As such, when the users intend to access the accounts, the users are required to, in general, login or sign-in to the accounts. In connection therewith, the users typically select user names, passwords or other credentials for the accounts when first registering for the accounts, or thereafter, and then subsequently use the credentials to access the accounts when desired. Often, the credentials selected by the users are be the same for different ones of the users' accounts.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

When users enroll for accounts (from relying parties), depending on types of the accounts, the users are often asked for the same data repeatedly for each of the accounts. This often may be tedious and time consuming for the users as the number of accounts for which they enroll grows. In addition, from time to time, preferred usernames or other login credentials selected by the users during registration are already taken/used, whereby the users are forced to select login credentials dissimilar from those used for their other accounts. And, as the number of such different login credentials grows, the users may find it increasingly difficult to remember their particular login credentials for each of their different accounts.

Uniquely, the systems and methods herein permit sharing of digital identities associated with users to relying parties (or account access interfaces associated therewith), whereby the enrollment processes of the users for accounts at the relying parties is streamlined. In particular, an identity provider (IDP) permits a user to register once, with the IDP, whereby a digital identity for the user is created and stored in a ledger data structure (i.e., a vault) associated with the IDP. Apart from the user, the IDP also offers a software development kit (SDK) to relying parties, which may be employed as a network-based application particularly associated with each of the relying parties. The SDK facilitates interactions between the user, the relying party, and the IDP to retrieve a digital identity (or portion thereof) (in a tokenized or otherwise secured manner), directly from the IDP, for use in enrolling the user with the relying party (in connection with opening a new account, etc.). This provides improved security to personal identifying information (PII) of the user included in the digital identity. In addition, the IDP and SDK permit login credentials to be managed by the user, through the IDP and/or SDK, for the user's various different accounts, whereby the user may be permitted to login to the relying party via a credential associated with the IDP and/or through use of a communication device bound to the digital identity at the IDP. In this manner, the IDP is therefore injected as a new party to the enrollment of the users for different accounts with different relying parties, thereby providing more efficient enrollment and management of credentials for each of the different accounts.

Figure 1:
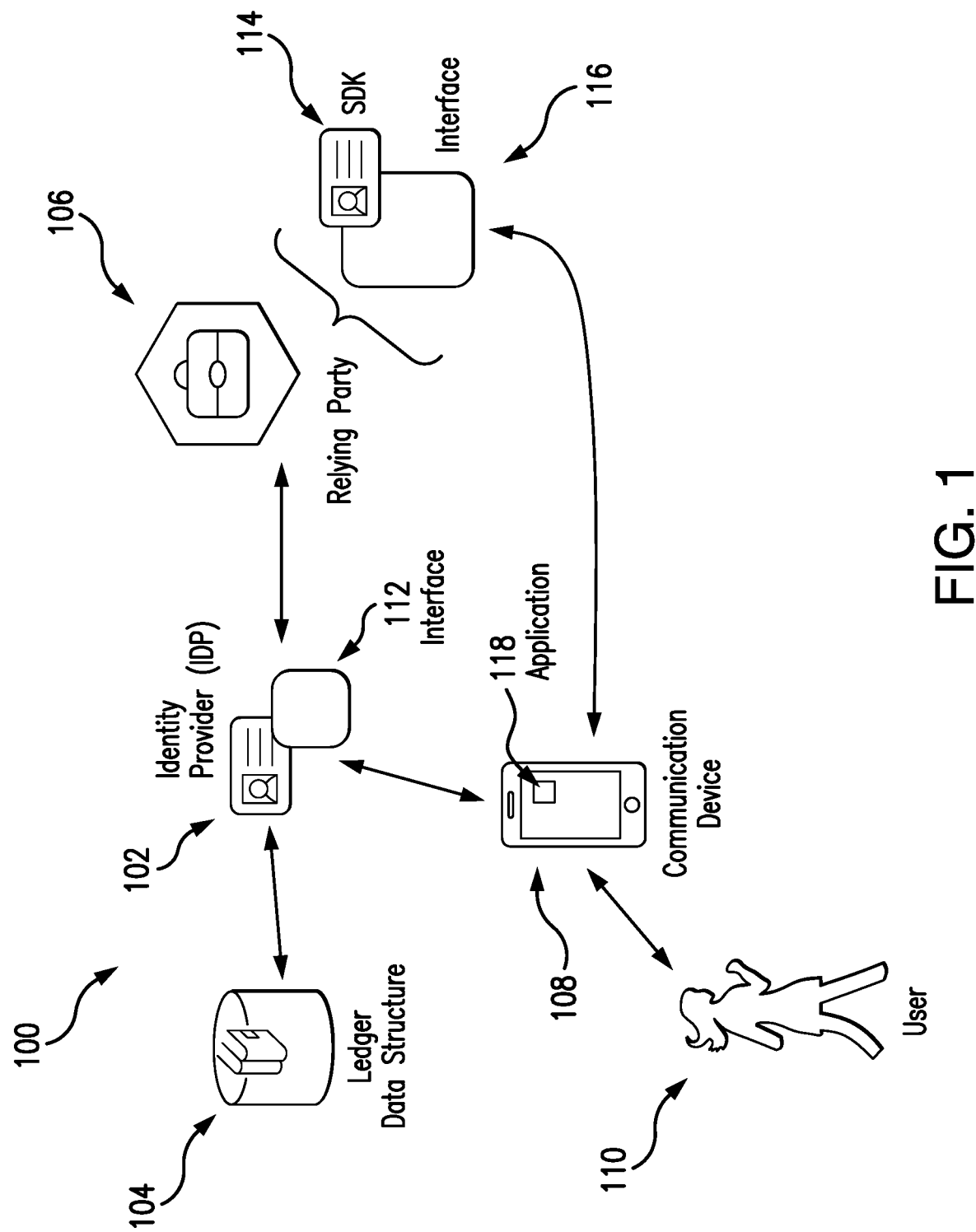
FIG. 1 illustrates an exemplary system of the present disclosure for utilizing an identity provider (IDP) to implement enrollment of a user to a relying party.

FIG. 1 illustrates an exemplary system 100 in which one or more aspects of the present disclosure may be implemented. Although the system 100 is presented in one arrangement, other embodiments may include one or more parts of the system 100 (or other parts) arranged otherwise depending on, for example, particular types of accounts and registrations available in the systems, relationships between users and relying parties, privacy concerns and/or requirements, etc.

The illustrated system 100 generally includes a digital identity provider (IDP) 102, a ledger data structure 104, a relying party 106, and a communication device 108 associated with a user 110, each of which is coupled in communication with one another through one or more networks. The network(s) is/are indicated generally by arrowed lines in FIG. 1, and each may include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

In the illustrated embodiment, the IDP 102 is generally a digital identity computing device or group of computing devices, which is/are configured to collect personal identifying information (PII) for users and to generate digital identities for the users (e.g., in response to requests by the users to do so, etc.). When the digital identities are generated, the IDP 102 is configured to store the digital identities in the ledger data structure 104. It should be appreciated that the IDP 102 may be a standalone entity, or it may be integrated, at least in part, in another entity. For example, the IDP 102 may be included in a payment network, such as, for example, the Mastercard® payment network, etc.

The IDP 102 includes and/or is associated with an interface 112, which is configured to permit (or facilitate) users (e.g., the user 110, etc.) to register a digital identity with the IDP 102, to manage an existing digital identity, and even to delete an existing digital identity. In one example, the interface 112 includes a website, hosted by the IDP 102 or on behalf of the IDP 102, whereby the interface 112 is accessible through a web browser at the user's communication device 108 and configures the IDP 102 to perform as described (e.g., to generate and/or manage a digital identity for the user 110, etc.). Additionally, or alternatively, in other examples, the interface 112 may include a web-based application (e.g., application 118, etc.), which is downloaded and executed on the user's communication device 108 to configure the communication device 108 to perform as described. Additional details of the interface 112 are described further below.

The relying party 106 includes a business or other entity that relies on identities of users to provide data or other services to the users. In this embodiment, the relying party 106 also includes and/or provides an interface 116, through which the data, for example, is made available to users (including the user 110). In one example, the interface 116 may include a website, hosted by the relying party 106 or on behalf of the relying party 106, whereby the interface 116 is accessible through a web browser at the communication device 108 of the user 110 and configures the relying party 106 to perform as described. Additionally, or alternatively, in other examples, the interface 116 may include a web-based application, which is downloaded and executed on the user's communication device 108 to configure the communication device 108 to perform as described. Regardless of the type, though, the interface 116 is configured to issue accounts to users (once enrolled), which then permit the users to access data through the interface 116, by presenting login credentials to the interface 116. For instance, the interface 116 may include a banking institution website, whereby the user 110 is permitted to login and view bank statements, account balances, or even direct financial transactions, etc. associated with his/her account. Or, the interface 116 may be associated with an account of the user 110 at a fitness application installed at the user's communication device 108, and through which the user 110 may access and view data received from a fitness tracker, set fitness goals, and share fitness data with other users, etc.

With continued reference to FIG. 1, the IDP 102 includes and/or is associated with a software development kit (SDK) 114, which is provided in connection with digital identity services offered by the IDP 102. In particular, when the relying party 106 opts into the digital identity services of the IDP 102, the IDP 102 is configured to provide the SDK 114 to the relying party 106 for integration with the interface 116 of the relying party 106. The SDK 114 is provided to configure the device executing the SDK 114 (e.g., a device at the relying party 106, the user's communication device 108, etc.) to interact with the IDP 102 to register a digital identity and to disseminate a registered digital identity, securely, to one or more relying parties.

In connection with the digital identity services from the IDP 102, the relying party 106 is required to conform to certain restrictions and/or procedures. First, the relying party 106 is configured to generate and transmit, to the IDP 102, an enrollment requirement file for enrollment of a user to an account at the relying party (and for access to the interface 112). The enrollment requirement file may include, for example, a listing of the required and/or optional PII for enrollment of the user to an account with the relying party 106, etc. The listing may include, for example, a name of the user, a mailing address of the user, a phone number of the user, a social security number of the user, etc. Upon receipt, the IDP 102 is configured to store the enrollment requirement file in memory. Second, the relying party 106 is configured to receive, from the IDP 102, and implement, an encryption mechanism (e.g., an encryption key, etc.) to secure communication between the IDP 102 and the relying party 106 (e.g., directly or via the SDK 114, etc.). And finally, the relying party 106 is configured to receive a deletion command from the IDP 102 and to delete PII or associated data received from the IDP 102 in connection with enrollment of the user.

The communication device 108 associated with the user 110 may include, for example, a portable communication device such as a tablet, smartphone, personal computers, etc. The communication device 108 is configured to permit the user 110 to access the interfaces 112 and 116. In one example, the communication device 108 includes a web browser, which configures the communication device 108 to communicate with the IDP 102 and the relying party 106, via the interface 112 and interface 116, respectively. What's more, the communication device 108 also includes the network-based application 118, which configures the communication device 108 to perform as described herein. In particular, the application 118 is associated with, created by, and/or disseminated by the IDP 102, whereby the application 118 facilitates communication with the IDP 102, as described in more detail below.

With that said, it should be appreciated that the user 110 is associated with an identity, which includes one or more of a name, a mailing address, a government ID number, an email address, a phone number, a birthdate, biometric references (e.g., facial images, etc.), a gender, an age, an eye color, account numbers, an employee identifier, and/or other information sufficient to distinguish the user 110 from other users. The identity may be evidenced by one or more physical documents issued by an authority (e.g., a federal government (e.g., a passport, a social security card, etc.), an insurance provider, a telecommunication provider (e.g., a mobile network operator (or MNO), etc.), a department of motor vehicles (or DMV), or other trusted identity authority, etc.). Such identity of the user 110, then, may then be the basis for (or at least partly the basis for) the digital identity of the user 110 at the IDP 102.

While only one IDP 102, one ledger data structure 104, one relying party 106, and one communication device 108 are illustrated in the system 100, it should be appreciated that additional ones of these parts or features may be included in other system embodiments. In addition, it should be appreciated that the system 100 is applicable to multiple users.

Figure 2:
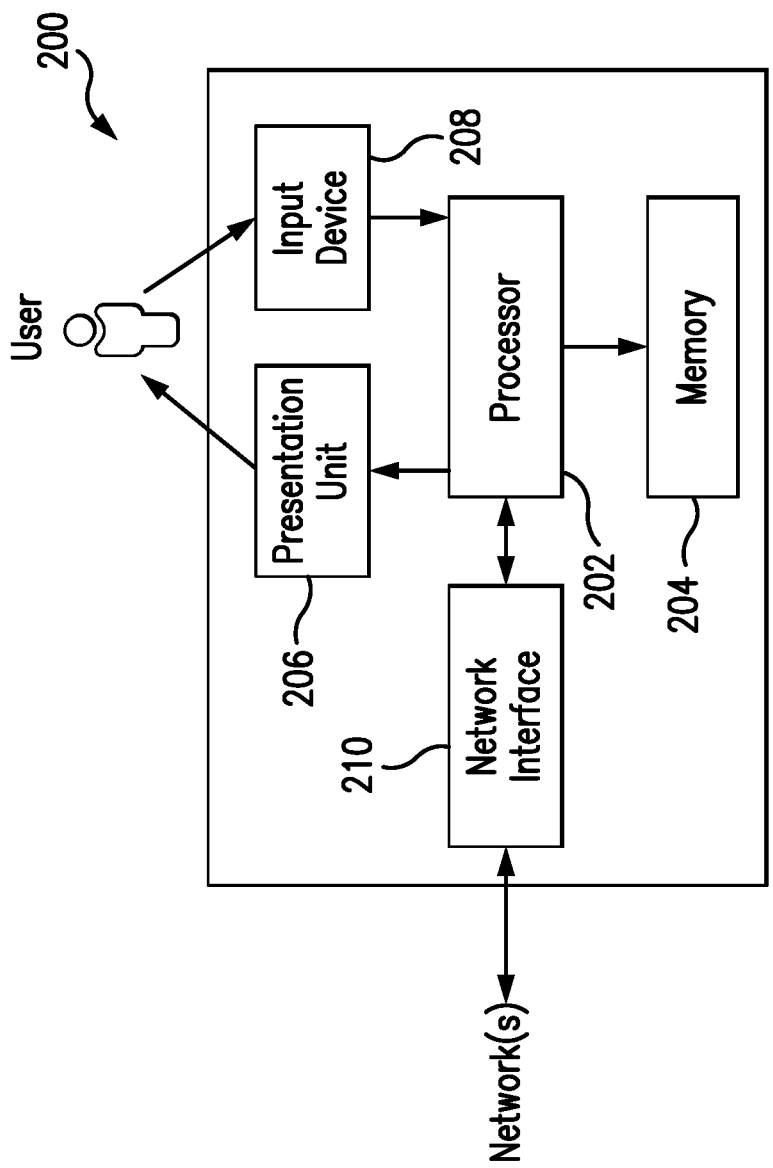
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the IDP 102, the ledger data structure 104, the relying party 106, and the communication device 108 may be considered, may include, and/or may be implemented in a computing device consistent with the computing device 200, coupled to (and in communication with) one or more of the networks illustrated in FIG. 1. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity details and data related to identities of users, digital identities of users, biometric references for users, identifiers, tokens, other payment account credentials, login credentials for user accounts, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein, whereby such instructions (and the performance of the resulting operations) effectively transform the computing device into a special-purpose device. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., prompts to the user 110 at the communication device 108 to enter PII, to enter credentials, etc.), etc. And various screens (e.g., as defined by the interfaces 112 and 116, etc.) (e.g., including instructions to capture an image of a document, etc.) may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) of the computing device 200 such as, for example, entries of PII, selections of portions of a digital identity to be shared with the relying party 106, etc., as further described below. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various exemplary embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., a NFC adapter, a Bluetooth™ adapter, etc.), a mobile network adapter, or other device capable of communicating to one or more different ones of the networks herein and/or with other devices described herein. Further, in some exemplary embodiments, the computing device 200 may include the processor 202 and one or more network interfaces incorporated into or with the processor 202.

Referring again to FIG. 1, the user 110 generally has two options to register a digital identity with the IDP 102, either via the interface 112 (or the application 118) directly through the IDP 102, or via the interface 116 indirectly through the relying party 106. In the former, the user 110 may access, at the communication device 108, the interface 112 associated with the IDP 102, whereby the user 110 interacts directly with the IDP 102 to register therewith and the IDP 102 is configured to register the user 110 through the operations described below (e.g., in connection with the SDK 114, etc.).

In the later, the user 110 may access the IDP 102 through the SDK 114 integrated in the interface 116, by selecting the option to interact with the IDP 102 for purposes of registration (e.g., via a button or other input included in the interface 116 which is selectable by the user 110 and linked to the SDK 114, etc.). In response, in this option, the relying party 106, as configured by the SDK 114, displays an option to the user 110 to register with the IDP 102 as a new user. The user 110 then provides an input (i.e., a selection to register) to the communication device 108, which in turn initiates the registration process. In particular, the relying party 106, as configured by the SDK 114, solicits a username, a password, an agreement to certain terms and conditions, PII, and (in some embodiments) biometric data from the user 110 at the communication device 108. In response, the user 110 provides the same (e.g., username JSmith and password Bob1951, etc.) (and a password reminder "Dad's name and birth year?") and further provides an agreement to the terms and conditions offered by the IDP 102 (for use of the digital identity service). In addition to the PII, the relying party 106, as configured by the SDK 114, is configured to solicit one or more settings associated with the username and password, such as, for example, using the same username and password for different relying parties when permitted, etc.

Regarding the PII, the user 110 may provide a name, a mailing address (e.g., a street, a city, a state and ZIP code, etc.), a home phone number, a work phone number, a cell phone number, an email address, government ID numbers (e.g., a driver's license number, a social security number, a passport number, etc.), his/her mother's maiden name, a gender, a birthplace, a date of birth, and a payment account credential, etc. (all, broadly, PII). It should be appreciated that additional PII may be solicited by the IDP 102 (directly or via the interface 116 or SDK 114) from the user 110 in other embodiments (e.g., during registration, after initial registration, etc.). It should also be appreciated that when providing the PII, the user 110 may designate the PII into different classes, i.e., whether the PII is considered, for example, standard or enhanced for security purposes, etc. In this exemplary embodiment, the user 110 designates a name, a mailing address and a phone number as being standard PII, and further designates a social security number, his/her mother' maiden name and a birthplace as enhanced PII. It should be appreciated that the IDP 102 may offer and/or the user 110 may opt to include additional or different classes of PII in other embodiments.

Figure 3:
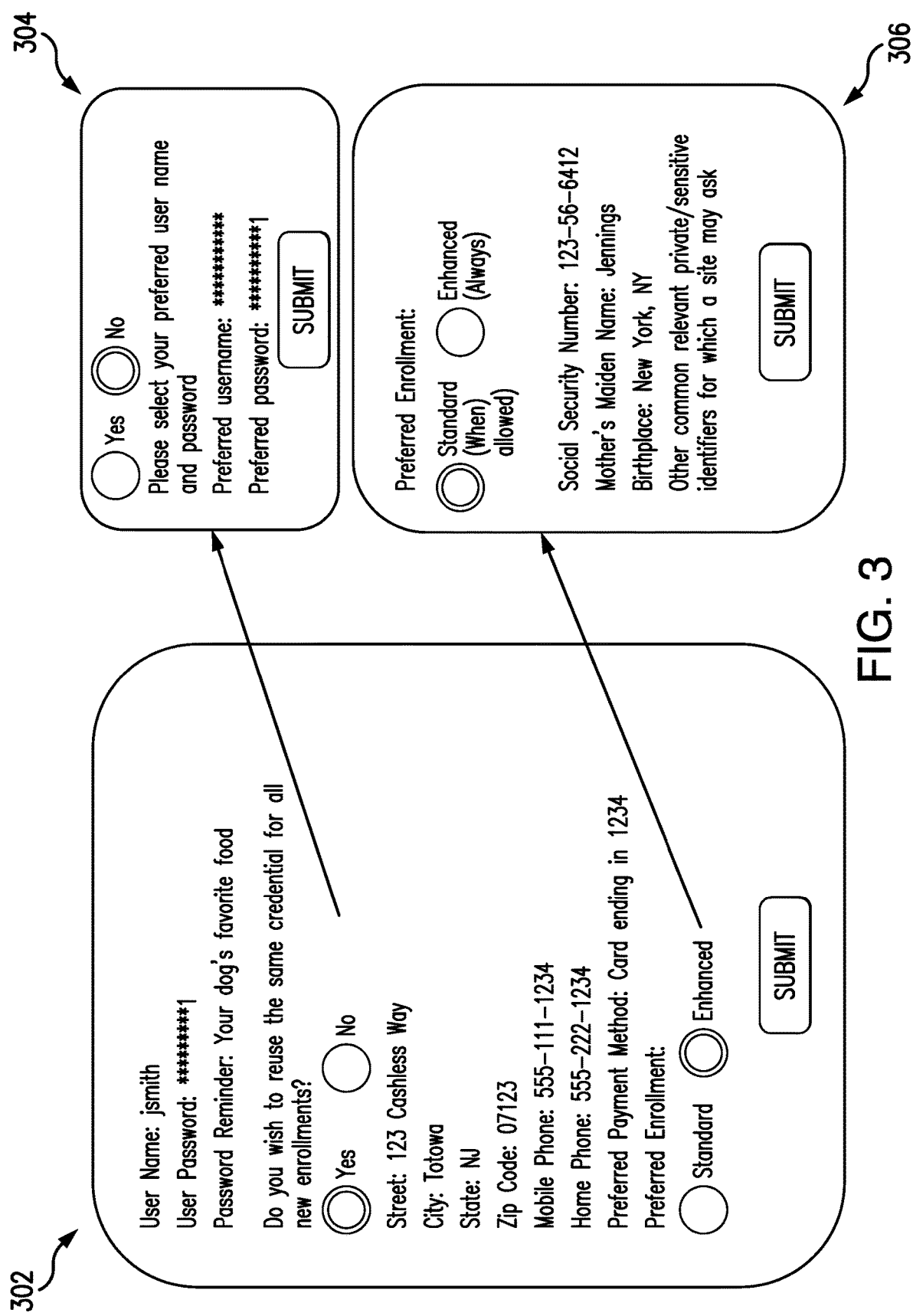
FIG. 3 illustrates multiple exemplary interfaces that may be employed in connection with the system of FIG. 1 to solicit, among other things, personal identifying information (PII) from the user during registration of the user, or after, to an identity provider (IDP)

FIG. 3 illustrates an exemplary screen 302 (broadly, an interface or part of an interface) that may be displayed to the user 110 at the communication device 108, by the relying party 106, as configured by the SDK 114 (or by the interface 116), in connection with registering the user 110 to the IDP 102. As shown, the screen 302 solicits a username, a password, various PII, a class designation for enrollment with regard to the PII, etc. As further shown, the interface 302 also includes toggle button, which, when selected, causes additional screens 304 and 306 to be displayed. Specifically, the toggle option for reuse of the same credentials permits screen 304 to be displayed, which permits the user 110 to enter the preferred credentials for all new enrollments with relying parties (and through which the user's digital identity from the IDP 102 is used). And, the toggle option for classes of PII permits screen 306 to be displayed, which permits the user 110 to select the class of PII which is the default for enrollment with a relying party (or multiple relying parties) and enter specific PII to be included in the selected class of PII. It should be appreciated that the screen 302 is merely exemplary and that other screens may be displayed to solicit the same or different information in other embodiments.

What's more, as part of the registration process for the user 110 with the IDP 102, the relying party 106, as configured by the SDK 114, captures a unique identifier associated with the user's communication device 108, such as, for example, a media access control (MAC) address, a mobile equipment identifier (MEID), a serial number, etc., and provides the same to the IDP 102.

With that said, it should be appreciated that the interface 112 at the IDP 102 (e.g., through a web-based interaction with the user 110 at the communication device 108 or through the application 118, etc.) may similarly be used, by the IDP 102, to directly receive the above-noted data from the user 110 (for registration with the IDP 102), such as the username, the password, the various user settings, the agreement to terms and conditions for the digital identity service, the user's PII, the classes and unique identifier of the communication device 108, the biometric data for the user 110, etc. (directly and without reliance on the relying party 106 and/or the SDK 114). In connection therewith, it should also be appreciated that screens similar to screens 302-306 may also be displayed to the user 110 at the communication device 108, by the IDP 102 (or by the interface 112), in connection with directly registering the user 110 to the IDP 102. Here, the communication device 108 may also be configured (e.g., by the application 118, etc.) to store the biometric received from the user 110 in memory (e.g., memory 204, etc.) of the communication device 108, for example, for subsequent use in authenticating the user 110 as described herein.

Then in the system 100, when the PII is received from the user 110 (at the relying party 106 during indirect registration of the user 110), the relying party 106, as configured by the SDK 114, passes the username, the password, the user's agreement to the terms and conditions for the proceed service, the selected settings, the user's PII (and PII classes), the received biometric, and the unique identifier associated with the user's communication device 108 to the IDP 102. In response, the IDP 102 is configured to compile a digital identity for the user 110, which includes the username, the password, the PII for the user 110 (and class designations), the biometric, and the unique identifier of the user's communication device 108, and to store the digital identity in the ledger data structure 104. Additionally, the IDP 102 is configured to bind the digital identity of the user 110 to the user's communication device 108, based on the unique identifier of the communication device 108. As indicated above, the unique identifier of the commination device 108 may include, but is not limited to, a MAC address, a unique device identifier (UDID), a MEID, etc. In connection with binding the user's digital identity to the communication device 108, then, the unique identifier of the communication device 108 is included in and/or identified to the digital identity stored in the data structure 104 (such that the communication device 108 is linked to the user's digital identity) thereby permitting the communication device 108 (as associated with the unique identifier) to be a validation mechanism for a one-time passcode (OTP) or for a biometric authentication of the user 110, as described more below. In this manner, therefore, the communication device 108 is identified as an authentication mechanism for the user 110 in connection with sharing the digital identity, or PII included therein, with one or more relying parties (such as the relying party 106).

In turn, when the user 110 expects to enroll with a relying party (such as the relying party 106), the user 110 is permitted to use the digital identity services of the IDP 102 to effect such enrollment.

Specifically, for example, the user 110 may seek to enroll with the relying party 106 to access an account at the relying party 106 and corresponding protected data associated with the relying party 106 (and potentially linked to the user's new account). In so doing, the user 110 may initially access the interface 116 for the relying party 106 (via the communication device 108), whereby a screen for login is presented to the user 110 at the communication device 108. The screen includes a button associated with the digital identity services of the IDP 102. In response, the user 110 selects the button, and the SDK 114 is executed, by the relying party 106, to cause the relying party 106 to display an IDP login screen to the user 110 at the communication device 108 (e.g., a light box overlaid on the interface 116, etc.).

In response, the user 110 enters the username and password associated with his/her registration with the IDP 102 (i.e., JSmith and Bob1951) to the IDP login screen and selects an input to login. In turn, the relying party 106, as configured by the SDK 114, solicits a class of PII to be provided to the relying party 106, which may include, for example, standard or enhanced. When the selection is made by the user 110, the relying party 106, as configured by the SDK 114, passes the username, password, and designated class for PII to the IDP 102. In turn, the IDP 102 is configured to generate an OTP for the transaction and to transmit the generated OTP to the communication device 108, via the application 118 (as part of an authentication process for the user 110). The communication device 108, as configured by the application 118, then displays the OTP to the user 110. At the same time, the relying party 106, as configured by the SDK 114, causes a screen soliciting the OTP from the user 110 to be displayed at the communication device 108. The user 110 enters the OTP, generated by the communication device 108, to the screen, whereby it is received by the relying party 106. And, the relying party 106, as configured by the SDK 114, transmits the OTP provided by the user 110 to the IDP 102. And, upon receipt of the OTP from the relying party 106, the IDP 102 is configured to authenticate the user 110 based on the OTP received from the relying party 106 matching the OTP generated at the communication device and transmitted to the IDP 102. In this way, the binding of the user's communication device 108 to the user's digital identity is utilized for authentication of the user 110 (e.g., to identify the user 110 to his/her communication device 108, etc.).

It should be appreciated that, in other embodiments, the IDP 102 may be configured to authenticate the user 110 via one or more biometrics received from the user 110 at the communication device 108. In particular, the IDP 102 may be configured to request a biometric from the user 110 at the communication device 108 (e.g., via the application 118, etc.) in connection with enrollment of the user 110 to the relying party 106. In turn, the communication device 108 may be configured to receive the requested biometric from the user 110 and compare the biometric to a reference biometric stored in memory at the communication device 108 (e.g., as provided by the user 110 at the communication device 108 during registration to the IDP 102, etc.). When the biometrics match (based on comparison techniques generally known in the art), the communication device 108 may then be configured to transmit an authentication message/confirmation to the IDP 102. Alternatively, the communication device 108 may be configured, instead, to transmit the biometric received from the user 110 to the IDP 102, whereby the IDP 102 may then compare the received biometric to the reference biometric for the user 110. In either case, the binding of the user's communication device 108 to the user's digital identity is again utilized for authentication of the user 110 (e.g., to identify the user 110 to his/her communication device 108, etc.).

However, when the user 110 is not authenticated (i.e., when the biometric provided by the user 110 does not match the reference biometric at the communication device 108), the communication device 108 is configured to transmit a failure notice to the IDP 102, and the IDP 102 is configured to transmit an enrollment failed indication to the relying party 106, whereby the SDK 114 is configured to seek a further authentication attempt (e.g., via the IDP 102, etc.) or to direct the user 110 to the interface 116 for conventional enrollment. In this manner, the relying party 106 is informed that no enrollment file (as described below) will be forthcoming from the IDP 102.

With that said, it should be appreciated that the OTP, the biometric, and other mechanisms may be employed between the IDP 102, the relying party 106, and/or the user 110 to authenticate the user 110 in connection with enrollment of the user 110 to the relying party 106 (or registration of the user 110 to the IDP 102, or login of the user 110 at the relying party 106, etc.).

When the user 110 is ultimately authenticated, the IDP 102 is configured to compile an enrollment file for the user 110, which is consistent with the class of PII selected by the user 110 (standard or enhanced) and the enrollment requirement file associated with the relying party 106, and to encrypt or otherwise obscure the enrollment file (e.g., with an encryption key known to the SDK 114, etc.). The IDP 102 is configured to then transmit the encrypted enrollment file to the relying party 106. And, the relying party 106 is configured, in turn, to decrypt the enrollment file (as necessary) and to generate an account for the user 110 at the relying party 106, which is specific to the user 110 and which is accessible via the username/password included in the enrollment file. Thereafter, the user 110 is permitted to access the account at the interface 116 of the relying party 106 to view content included therein. In this manner, the user 110 avoids providing the PII directly to the relying party 106 in order to enroll for the account through the interface 116.

When the user 110 later returns to the interface 116 (e.g., to access his/her account at the relying party 106, etc.), the interface 116 is again configured to present a login screen to the user 110 at the communication device 108, whereby the user 110 is provided the option to login through the IDP 102. When the user 110 selects to login through the IDP 102, the relying party 106, as configured by the SDK 114, instructs the user 110 to generate a one-time passcode (OTP) for the transaction, whereby the communication device 108 is configured to generate the OTP (either with or without first authenticating the user 110, for example, via a biometric provided by the user 110, etc.). The communication device 108 is configured to then transmit the generated OPT to the IDP 102 and to display the OTP to the user 110 at the communication device 108.

At the same time, as above, the relying party 106, as configured by the SDK 114, causes a screen soliciting the OTP from the user 110 to be displayed at the communication device 108. And, in turn, the user 110 enters the OTP, generated by the communication device 108, to the screen, whereby it is received by the relying party 106. The relying party 106, as configured by the SDK 114, transmits the OTP provided by the user 110 to the IDP 102. Then, upon receipt of the OTP from the communication device 108 and the relying party 106, the IDP 102 is configured to authenticate the user 110 based on the OTPs being a match. When authenticated, the IDP 102 is configured to confirm authentication to the relying party 106, whereby the user 110 is again permitted to be logged into the interface 116 (based on the OTP and without providing his/her login credentials or other credentials to the relying party 106 to obtain access to his/her account).

It should be appreciated that the IDP 102 is further configured to permit the user 110 to manage credentials and PII included in the user's digital identity stored in the ledger data structure 104, for example, via the interface 112 (e.g., upon access by the user 110 to his/her account at the IDP 102 through the interface 112, etc.).

Figure 4:
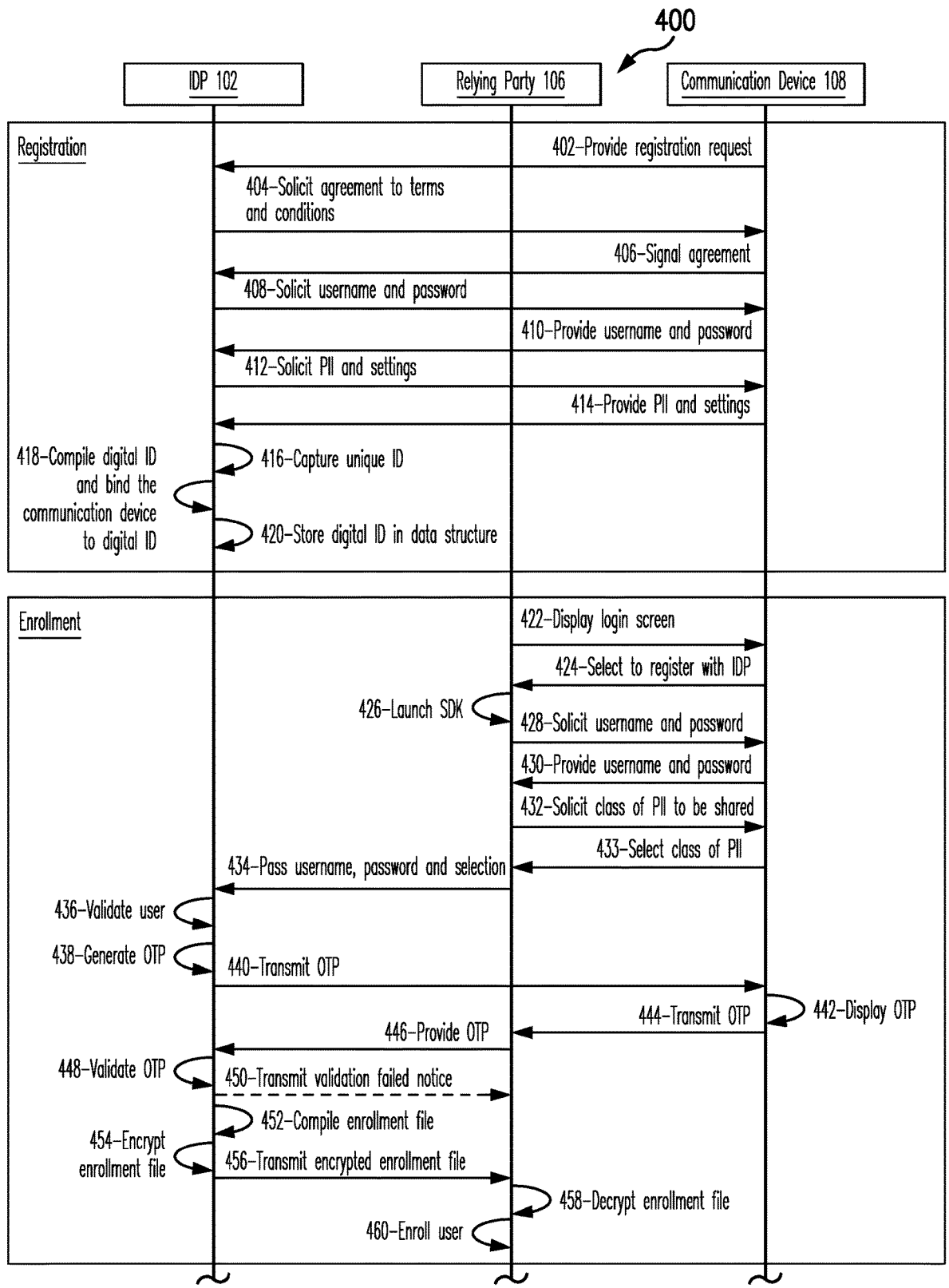
FIG. 4 illustrates an exemplary method, which may be implemented in connection with the system of FIG. 1, to register a user to an IDP, enroll the user to a relying party through use of the IDP, and allow the user to subsequently access the relying party by way of a digital identity of the user associated with the IDP.
Figure 4:
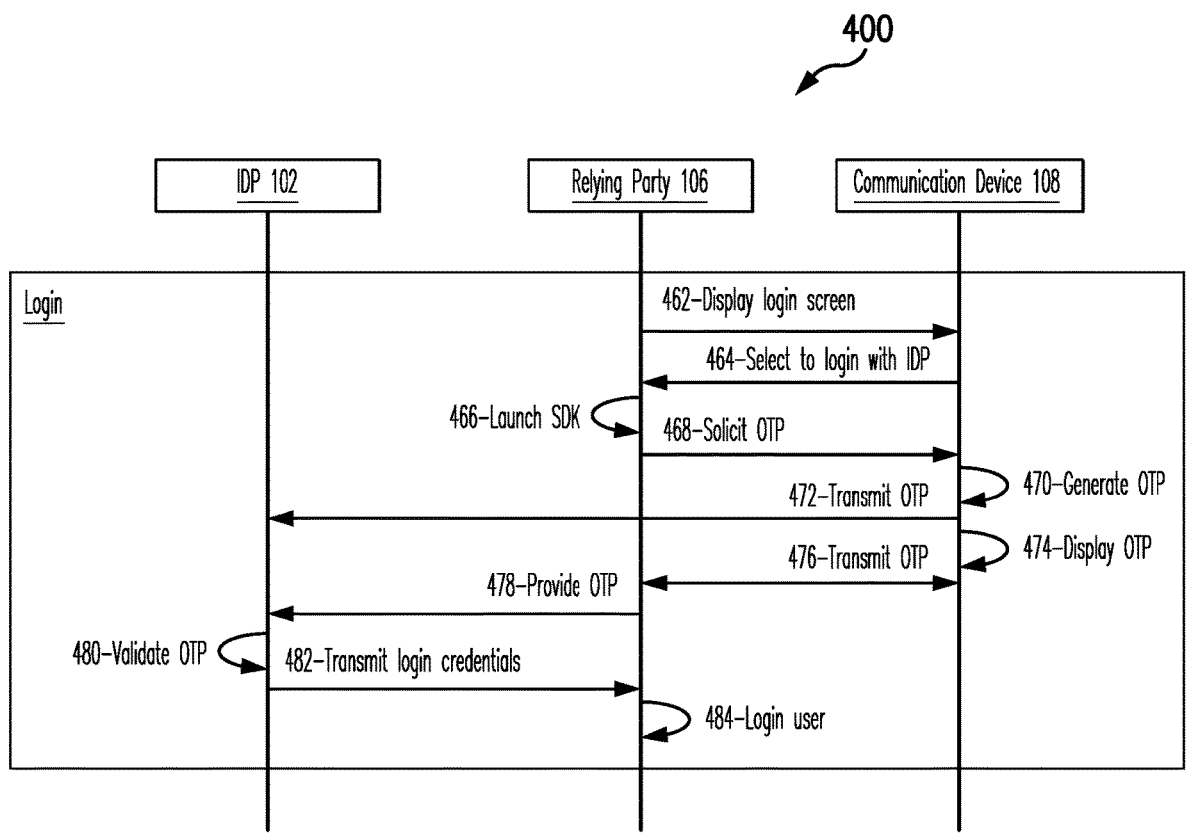

FIG. 4 illustrates an exemplary method 400 for use in relying on an IDP to implement enrollment of a user to a relying party (and for use in allowing subsequent access by the user to the relying party following such enrollment). The exemplary method 400 is described as implemented in (or through) the IDP 102, the communication device 108, and the relying party 106, and other parts of system 100. The method 400 is also described with reference to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 400.

At the outset in the method 400, the user 110 elects to register with the IDP 102 directly through the IDP 102 via the interface 112 (rather than indirectly through the relying party 106 (as generally described above in the system 100)). In doing so, the user 110 accesses the IDP 102 for registration, through the interface 112. Consistent therewith, the user 110 selects a registration option at the interface 112, as presented at the communication device 108, which in turn, provides a registration request, at 402, to the IDP 102. In turn, the IDP 102, via the interface 112, solicits an agreement by the user 110, at 404, with certain terms and conditions associated with the digital identity service provided from the IDP 102. In response, the user 110 agrees, whereby the communication device 108, via the interface 112, signals agreement to the terms and conditions, at 406.

Next, at 408, the IDP 102 solicits a new username and password from the user 110 for the registration. And, in response, the user 110 provides a username and password to the communication device 108, at the interface 112, which provides, at 410, the username and the password to the IDP 102. It should be appreciated that the IDP 102 may enforce certain rules for the username and password, such as, for example, no repeated usernames; a password having a certain number of letters, numbers and special characters; etc. When the username and password are acceptable (or otherwise accepted by the IDP 102), the IDP 102 solicits, at 412, various PII and account settings from the user 110, via the interface 112 (including, in some examples, a reference biometric for the user 110 for use in subsequently authenticating the user 110, etc.). The PII and setting may include those illustrated in the exemplary screen 302 of FIG. 3, or more or less. When the user 110 provides the requested PII and settings, or portion thereof, through the communication device 108, the communication device 108 provides, at 414, the PII and settings (and reference biometric, when provided), from the user 110, to the IDP 102 via the interface 112. In some embodiments, when the user 110 provides the reference biometric, the communication device 108 may also store the reference biometric in memory associated therewith (in addition to, or in lieu of, sending it to the IDP 102). In this way, the communication device 108 may subsequently use the reference biometric in connection with authenticating the user 110 (as described herein).

In connection therewith, as part of the communication of the agreement, the username and password, and/or the PII, the IDP 102 also captures, at 416, a unique identifier associated with the user's communication device 108 (e.g., a MAC address, a MEID, a serial number, etc.). Then, at 418, when the above data is received, the IDP 102 compiles a digital identity (or digital ID) for the user 110 and binds the communication device 108, based on the unique identifier, to the digital identity. For instance, the unique identifier of the communication device 108 may be included in and/or identified (or linked) to the user's digital identity (e.g., in the data structure 104, etc.), thereby permitting the communication device 108 to be a validation mechanism for an OTP or biometric authentication of the user 110. As such, once the unique identifier of the communication device 108 is established at the IDP 102, it can be used to ensure a higher degree of authenticity of any OTP or biometric data (or corresponding authentication confirmations) received from the communication device 108 (and that the communication device 108 from which the data is received is actually associated with the user 110 for which the data is directed). The IDP 102 then stores the digital identity in the ledger data structure 104, as bound to the unique identifier of the user's communication device 108.

It should be appreciated that in various embodiments, in connection with compiling and/or storing the digital identity for the user 110, the IDP 102 may seek to validate the received PII, or parts thereof, based on images of documents solicited and/or received from the user 110 and/or via third parties. It should also be appreciated that such validation may be omitted in other embodiments.

At this point in the method 400, the user 110 is registered with the IDP 102 and is able to rely on his/her digital identity at the IDP 102 to subsequently enroll to one or more relying parties, when desired.

That said, the user 110 may seek to enroll with the relying party 106, whereby the user 110 accesses the interface 116 associated with the relying party 106. In response, the relying party 106, via the interface 116, displays, at 422, a login screen to the user 110 at the communication device 108. The user 110, in turn, selects to enroll to the relying party 106 with the IDP 102, at 424.

Upon receipt of the user's selection, the relying party 106, and in particular the interface 116, launches, at 426, the SDK 114. The relying party 106 (and in particular, the SDK 114) solicits the username and password for the user 110, at 428. And, the user 110 responds by providing, at 430, the user's username and password (as created when registering with the IDP 102). In addition, the relying party 106, via the SDK 114, solicits, at 432, from the user 110, an identification of the class of PII to be shared with the relying party 106 (e.g., standard or enhanced, etc.) from the user's digital identity. The user 110 responds, at 433, with a selected class (or potentially, relies on a default set by the user 110 during registration with the IDP 102), whereby the communication device 108 selects/confirms the class of PII to share with the relying party 106.

Next, at 434, the relying party 106, via the SDK 114, passes the username, password and selection of the class of PII to the IDP 102. In response, the IDP 102 validates, at 436, the user 110 (based on the provided username and password, etc.). The IDP 102 then generates an OTP, at 438, and transmits the OTP, at 440, to the user's communication device 108. Alternatively, upon validating the user 110 (again based on the provided username and password, etc.), the IDP 102 may instead transmits a direction to the user's communication device 108 to generate the OTP (where the communication device 108 is identified, for example, based on the unique identifier of the communication device 108 included in the user's digital identity or otherwise), whereby the communication device 108 (via the application 118, for example) generates the OTP.

In any case, in response, the communication device 108 displays, at 442, the OTP to the user 110 (e.g., via the application 118, etc.) (whether it is received from the IDP 102 or generated by the communication device 108). The user 110 is then able to retrieve the OTP and enter it into a screen displayed at the communication device 108, by the relying party 106 (and, in particular, by the SDK 114). The communication device 108, in turn, transmits, at 444, the OTP to the relying party 106, via interaction between the SDK 114 and the interface 116. In response, the relying party 106, and in particular, the SDK 114, provides the OTP to the IDP 102, at 446. And, at 448, the IDP 102 validates the OTP received from the relying party 106 based on the OTP received from the communication device 108 (i.e., validates the user 110 when the OTPs match).

In other embodiments, upon validating the user 110 (again based on the provided username and password, etc.) (at 436), the IDP 102 may transmits a direction to the user's communication device 108 to obtain a biometric for the user 110 (e.g., via the application 118, etc.). In turn, the communication device 108 may request and receive the biometric from the user 110 and compare the biometric to a reference biometric for the user 110 stored in memory at the communication device 108 (e.g., as provided by the user 110 at the communication device 108 during registration to the IDP 102, etc.). When the biometrics match, the communication device 108 may then transmit an authentication message/confirmation to the IDP 102.

When the IDP 102 is unable to validate the OTP (or when the user's biometric is not validated or authenticated), the IDP 102 may transmit, at 450 (optionally, as indicated by the dotted line in FIG. 4), a validation failed notice to the relying party 106, whereby the SDK 114 may seek a further authentication or validation attempt (e.g., via the IDP 102 whereby the IDP 102 may generate another OTP or request the user 110 to provide another biometric, etc.). Or, the IDP 102 may direct the user 110 to the interface 116 of the relying party 106 for conventional enrollment.

Thereafter in the method 400, in any case where validation is successful (of the OTP or the user's biometric), the IDP 102 retrieves the digital identity for the user 110 from the ledger data structure 104, retrieves the enrollment requirement file for the relying party 106, and compiles, at 452, an enrollment file for the relying party 106. The enrollment file includes a username, a password, and PII (either standard or enhanced, as selected by the user 110) for the user 110, etc. The IDP 102 then encrypts, at 454, the enrollment file and transmits, at 456, the enrollment file to the relying party 106. The relying party 106 in turn decrypts the enrollment file, at 458, and enrolls the user 110 to the interface 116, at 460, whereby the user 110 is provided access thereto via the username and password included in the enrollment file (without the user 110 actually providing any PII directly to the relying party 106 in connection with enrolling with the relying party 106).

With that said (and as further shown in FIG. 4), it should be appreciated that when the user 110 returns to the interface 116 of the relying party 106 after enrollment (at the communication device 108), to login to the interface 116 to access his/her account with the relying party 106, for example, the relying party 106 (via the interface 116) may display, at 462, a login screen to the user 110. At the login screen, the user 110 may either use the username and password from his/her digital identity to access the interface 116 or the user 110 may rely on the IDP 102 to do so. Here, the user 110 selects, at 464, to login to the interface 116 with the IDP 102, at the login screen for the interface 116, whereupon the SDK 114 is launched, at 466, and a screen is displayed to the user 110 at the communication device 108, which solicits an OTP from the user 110. In connection therewith, the communication device 108 generates, at 470, an OTP, where the OTP is then provided, at 472, from the communication device 108 to the IDP 102. The communication device 108 also displays at 474, the OTP to the user 110. The user 110 is then permitted to enter the OTP displayed at the communication device 108 to a screen associated with the relying party 106 soliciting the OTP, at the communication device 108 (or at another device associated with the user). The OTP is provided, at 476, from the communication device 108 to the relying party 106, or more specifically, to the SDK 114, which in turn provides the received OTP, at 478, to the IDP 102. In response, the IDP 102 validates the received OTP, at 480, and when validated, the IDP 102 transmits, at 482, the username and the password for the user 110 (broadly, the user's login credentials) to the interface 116, via the SDK 114, at the relying party 106, thereby logging the user 110 into the interface 116, at 484, without the user 110 actually presenting a username or password (or other login credential(s)) to the interface 116 (i.e., such that the login credentials are provided by the IDP 102 in lieu of being provided by the user 110).

While the login aspect of FIG. 4 is presented with respect to the OTP, it should be appreciated that a biometric may be used in lieu of or in addition to the OTP, whereby the user 110 may be requested to provide a biometric at the communication device 108. In turn, the communication device 108 may then provide the biometric to the IDP 102 and/or an authentication indicator to the IDP 102 (e.g., based on a biometric authentication of the user 110 at the communication device 108, etc.). In response, the IDP 102 may validate the user 110 by comparison of the biometric received from the communication device 108 to a reference biometric, or based on receipt of the biometric indicator. In either case, the IDP 102 is permitted to proceed to share the login credential(s) with the relying party 106.

Additionally, the user 110 may be permitted to access the interface 112 to manage the digital identity stored in the ledger data structure 104, as desired. The management may be subject to the user 110 logging into the interface 112 with a login credential for the IDP 102 and/or an OTP process as described above.

Figure 5:
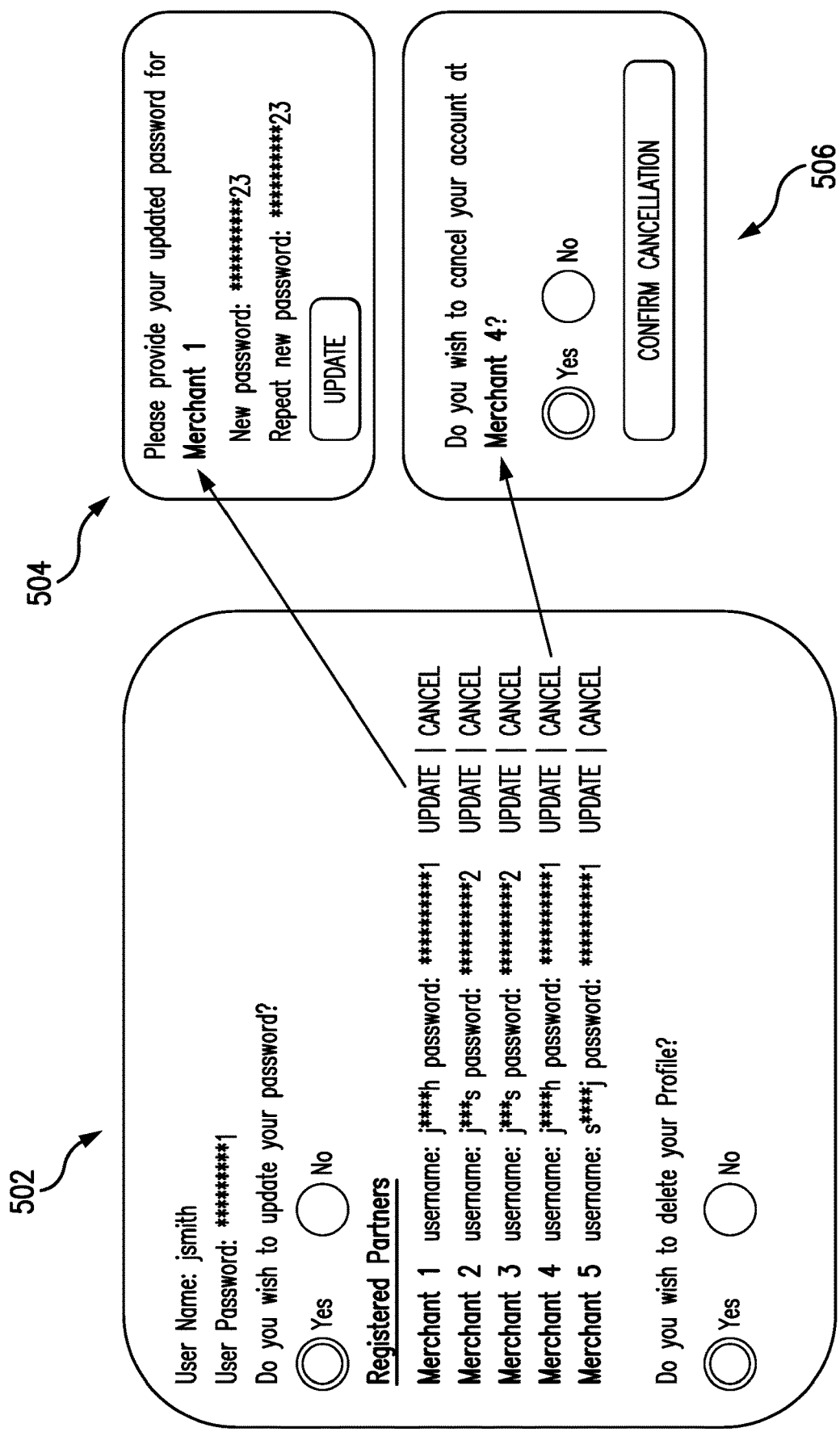
FIG. 5 illustrates multiple exemplary interfaces that may be employed in connection with the system of FIG. 1 to manage a user's credential associated with multiple relying parties.

FIG. 5 illustrates a series of exemplary screens 502, 504, and 506, which may be displayed to the user 110, at the communication device 108 (or at another computing device associated with the user 110), by the interface 112 at the IDP 102 in connection with managing the user's digital identity, etc. As shown, at the screen 502, the user 110 is able to select from his/her various usernames and passwords included in the digital identity for accounts held by the user 110 at different merchants (broadly, relying parties). When the user 110 selects to update a username and/or password for an account (e.g., for an account at Merchant 1, etc.), screen 504 is displayed to the user 110 at the interface 112 (via the user's communication device 108 or other computing device), whereupon the user 110 is permitted to enter a new username and password for the account. Then, when the user 110 selects to submit the desired changes (e.g., by the "Submit" button, etc.), the IDP 102 transmits the new username and/or password to the selected relying party (e.g., the Merchant 1 in this example, etc.). And, the relying party updates the username and password, if permitted, and confirms the update to the IDP 102, which then indicates a successful update to the user 110 at one or more further screens in the interface 112. If the update is not successful (e.g., based on rules imposed by the relying party (e.g., the new username is already being used, the new password is insufficient, etc.), etc.), though, the relying party will indicate the same to the IDP 102, which, in turn, informs the user 110 of the error and permits a new username and/or password to be attempted.

Further, as shown in FIG. 5, the user 110 is permitted to cancel an enrollment with one or more relying parties at the screen 502 as well (e.g., any one of Merchants 1-5, etc.). When the option to cancel is selected, the interface 112 displays screen 506, which solicits a confirmation from the user 110 to cancel the enrollment. When the user 110 confirms, the IDP 102 transmits a cancellation command to the relying party, which in turn, cancels the account and/or enrollment of the user 110 with the selected relying party, and confirms the same to the IDP 102. The cancellation generally includes the deletion of all PII related to the user 110 (in general or as received from the IDP 102) for the given account.

Figure 6:
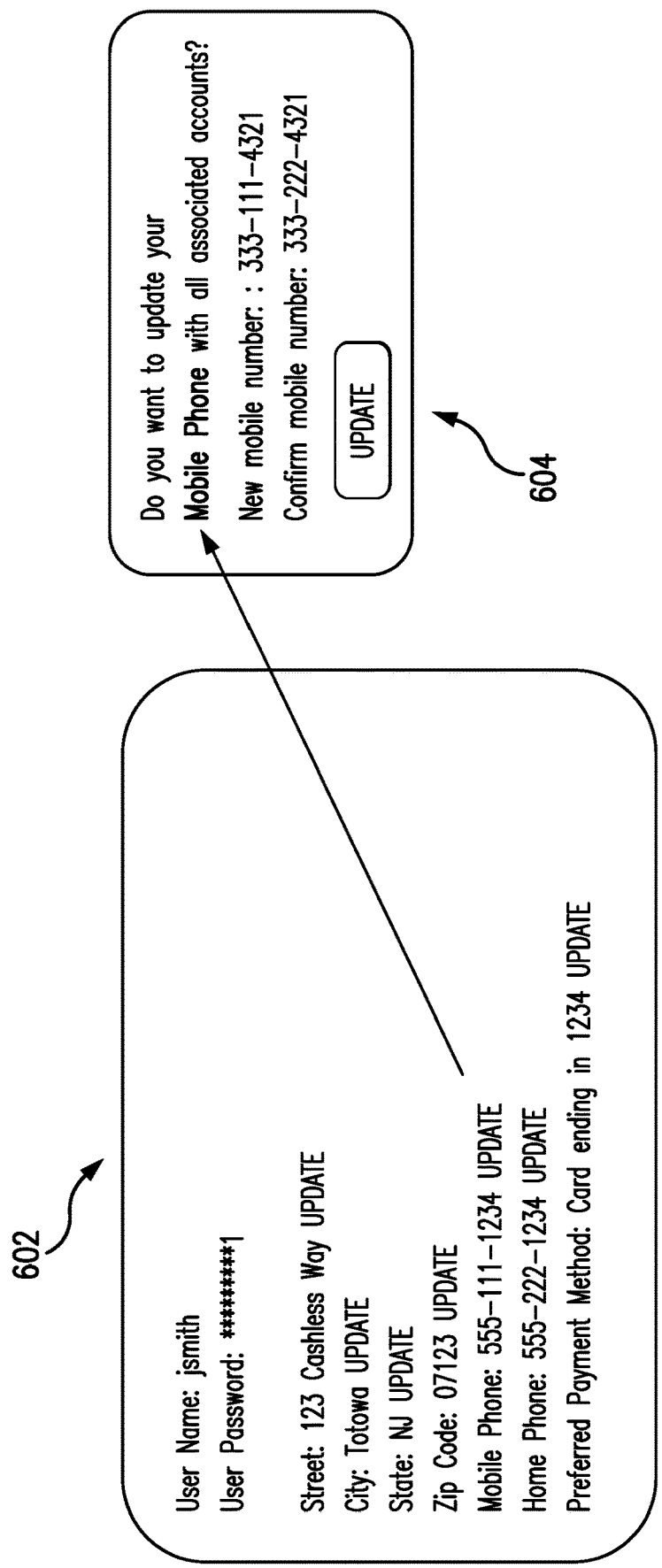
FIG. 6 illustrates multiple exemplary interfaces that may be employed in connection with the system of FIG. 1 to manage a user's PII included in a digital identity.

Additionally, with reference to FIG. 6, the interface 112 may display the exemplary screens 602 and 604 to the user 110 (at the communication device 108 or at another computing device associated with the user 110). The exemplary screen 602, as part of the interface 112, permits the user 110 to alter PII included in the user's digital identity (in general). Specifically, the user 110 may select to update a mobile phone number, upon which the exemplary screen 604 is displayed to the user 110, via the interface 112 (e.g., at the communication device 108 or another computing device, etc.). In response, the user 110 is permitted to enter a new mobile phone number, and re-enter the new mobile phone number to confirm, and then select "Update" to commit the change in the mobile phone number of the digital identity. Upon selection and confirmation by the user 110, the IDP 102 receives the selection, via the interface 112, and compiles the digital identity to include the new mobile phone number (and deletes the prior mobile phone number) and stores the digital identity in the ledger data structure 104.

Once the desired modifications are complete, the IDP 102 broadcasts the change(s) to the digital identity (e.g., the mobile phone number, etc.) to each relying party who has enrolled the user 110 through the IDP 102 (e.g., Merchants 1-5, etc.). Consistent with the above description, each of the relying parties implements the change in the PII and confirms that the PII has been changed to the IDP 102. The IDP 102 then confirms the change(s) as complete to the user 110, via one or more screens of the interface 112. If an error, for any reasons, occurs when trying to implement the change, the relying party notifies the IDP 102, which in turn notifies the user 110 through one or more screens of the interface 112.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, by a computing device, a login credential for a user from a relying party in connection with enrolling the user to the relying party, the user associated with a digital identity stored in a data structure, the digital identity including personal identifying information (PII) of the user; (b) generating, by the computing device, a one-time-passcode (OTP) and transmitting the OTP to a communication device bound to the digital identity associated with the user, based on a unique identifier associated with the communication device; (c) receiving, at the computing device, an OTP from the relying party; (d) when the OTP generated by the computing device matches the OTP received from the relying party, compiling, by the computing device, an enrollment file for the user, the enrollment file including at least a portion of the PII of the user from the digital identity for the user; and (e) transmitting the enrollment file to the relying party, thereby permitting the relying party to enroll the user to an account without the user providing any PII directly to the relying party.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, by a computing device, a login credential for a user from a relying party in connection with enrolling the user to the relying party, the user associated with a digital identity stored in a data structure, the digital identity including personal identifying information (PII) of the user; (b) transmitting, by the computing device, a biometric authentication request for the user to a communication device bound to the digital identity associated with the user, based on a unique identifier associated with the communication device; (c) receiving, at the computing device, a biometric confirmation from the communication device indicating authentication of the user; (d) compiling, by the computing device, an enrollment file for the user in response to the biometric confirmation; (e) including, by the computing device, at least a portion of the PII of the user from the digital identity for the user to the enrollment file; and; and (f) transmitting the enrollment file to the relying party, thereby permitting the relying party to enroll the user to an account without the user providing any PII directly to the relying party.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, by a computing device associated with the IDP, a one-time-passcode (OTP) generated by a communication device bound to the digital identity associated with the user in connection with a login request by the user for the account at the relying party, the digital identity including a login credential specific to the relying party; (b) receiving, at the computing device, an OTP from the relying party; (c) comparing, by the computing device, the OTP generated by the communication device and the OTP received from the relying party; and (d) when the OTP generated by the communication device matches the OTP received from the relying party, transmitting, by the computing device, the login credential specific to the relying party from the digital identity of the user to the relying party, whereby the user is permitted to login to the account at the relying party by providing the OTP to the computing device but without providing the login credential to the relying party.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for enrolling a user to a relying party through an identity provider (IDP) associated with a digital identity for the user, the method comprising:
    receiving, by a computing device, a login credential for a user from a relying party in connection with enrolling the user to the relying party, the user associated with a digital identity stored in a data structure, the digital identity including personal identifying information (PII) of the user;
    generating, by the computing device, a one-time-passcode (OTP) and transmitting the OTP to a communication device bound to the digital identity associated with the user, based on a unique identifier associated with the communication device;
    receiving, at the computing device, an OTP from the relying party;
    when the OTP generated by the computing device matches the OTP received from the relying party, compiling, by the computing device, an enrollment file for the user, the enrollment file including at least a portion of the PII of the user from the digital identity for the user; and
    transmitting the enrollment file to the relying party, thereby permitting the relying party to enroll the user to an account without the user providing any PII directly to the relying party.

2. The computer-implemented method of claim 1, wherein the login credential includes a username and a password; and
    wherein the at least a portion of the PII included in the enrollment file includes a mailing address, an email address, a phone number, and a government ID number associated with the user.

3. The computer-implemented method of claim 1, further comprising:
    receiving, at the computing device, the PII from the user for inclusion in the digital identity, via a software development kit (SDK) integrated into an interface associated with the relying party; and
    compiling, by the computing device, the digital identity for the user based on the received PII and storing the digital identity in the data structure.

4. The computer-implemented method of claim 3, further comprising, prior to compiling the enrollment file, retrieving an enrollment requirement file associated with the relying party, the enrollment requirement file identifying PII required by the relying party in connection with enrolling the user to the relying party; and
    wherein compiling the enrollment file includes compiling the enrollment file to include the PII of the user identified by the enrollment requirement file.

5. The computer-implemented method of claim 4, further comprising receiving, from the relying party, a selection of a class of PII by the user via the SDK; and
    wherein compiling the enrollment file includes compiling the enrollment file further based on the selection of the class of PII.

6. The computer-implemented method of claim 1, further comprising encrypting the enrollment file with an encryption key shared with the relying party, prior to transmitting the enrollment file to the relying party; and wherein transmitting the enrollment file includes transmitting the encrypted enrollment file.

7. The computer-implemented method of claim 1, wherein the OTP received from the relying party is a first OTP received from the relying party; and wherein the method further comprises:

receiving, at the computing device, an OTP generated by the communication device in connection with a login request by the user for the account to which the user is enrolled;

receiving, at the computing device, a second OTP from the relying party;

confirming, by the computing device, that the OTP generated by the communication device matches the second OTP received from the relying party; and transmitting, by the computing device, the login credential for the user to the relying party, whereby the relying party logs the user into said account based on the login credential received from the computing device without receiving the login credential directly from the user.

8. A computer-implemented method for enrolling a user to a relying party through an identity provider (IDP) associated with a digital identity for the user, the method comprising:

receiving, by a computing device, a login credential for a user from a relying party in connection with enrolling the user to the relying party, the user associated with a digital identity stored in a data structure, the digital identity including personal identifying information (PII) of the user;

transmitting, by the computing device, a biometric authentication request for the user to a communication device bound to the digital identity associated with the user, based on a unique identifier associated with the communication device;

receiving, at the computing device, a biometric confirmation from the communication device indicating authentication of the user;

compiling, by the computing device, an enrollment file for the user in response to the biometric confirmation;

including, by the computing device, at least a portion of the PII of the user from the digital identity for the user to the enrollment file; and transmitting the enrollment file to the relying party, thereby permitting the relying party to enroll the user to an account without the user providing any PII directly to the relying party.

9. The computer-implemented method of claim 8, further comprising:

receiving, at the computing device, the PII from the user for inclusion in the digital identity, via a software development kit (SDK) integrated into an interface associated with the relying party; and compiling, by the computing device, the digital identity for the user based on the received PII and storing the digital identity in the data structure.

10. The computer-implemented method of claim 8, further comprising, prior to compiling the enrollment file, retrieving an enrollment requirement file associated with the relying party, the enrollment requirement file identifying PII required by the relying party in connection with enrolling the user to the relying party; and wherein compiling the enrollment file includes compiling the enrollment file to include the PII of the user identified by the enrollment requirement file.

11. The computer-implemented method of claim 10, further comprising receiving, from the relying party, a selection of a class of PII by the user via the SDK; and wherein compiling the enrollment file includes compiling the enrollment file further based on the selection of the class of PII.

12. The computer-implemented method of claim 8, further comprising:

receiving, at the computing device, a one-time-passcode (OTP) generated by the communication device bound to the digital identity associated with the user in connection with a login request by the user to the relying party at an interface associated with the relying party;

receiving, at the computing device, an OTP from the relying party; and comparing, by the computing device, the OTP generated by the communication device and the OTP received from the relying party; and when the OTP generated by the communication device matches the OTP received from the relying party, transmitting, by the computing device, the login credential for the user to the relying party, thereby providing access by the user to the relying party through the interface associated with the relying party without the user directly providing the login credential to the interface.

13. The computer-implemented method of claim 8, further comprising encrypting the enrollment file with an encryption key shared with the relying party, prior to transmitting the enrollment file to the relying party; and wherein transmitting the enrollment file includes transmitting the encrypted enrollment file.

14. The computer-implemented method of claim 8, wherein the login credential includes a username and a password; and wherein the at least a portion of the PII included in the enrollment file includes a mailing address, an email address, a phone number, and a government ID number associated with the user.

* * * * *